United States Patent
Kang et al.

(10) Patent No.: US 10,510,093 B2
(45) Date of Patent: Dec. 17, 2019

(54) SYSTEMS AND METHODS FOR PROVIDING ADVERTISING SERVICES TO DEVICES WITH DYNAMIC AD CREATIVE DEEP LINKING

(71) Applicant: Vungle, Inc., San Francisco, CA (US)

(72) Inventors: Daniel Kang, San Francisco, CA (US); Zain Jaffer, San Francisco, CA (US)

(73) Assignee: Vungle, Inc., San Francisco, CA (US)

( * ) Notice: Subject to any disclaimer, the term of this patent is extended or adjusted under 35 U.S.C. 154(b) by 731 days.

(21) Appl. No.: 14/677,959

(22) Filed: Apr. 2, 2015

(65) Prior Publication Data

US 2016/0292728 A1    Oct. 6, 2016

(51) Int. Cl.
| | | |
|---|---|---|
| G06Q 30/02 | (2012.01) | |
| G06F 3/0484 | (2013.01) | |
| G06F 3/0485 | (2013.01) | |
| H04L 29/08 | (2006.01) | |

(52) U.S. Cl.
CPC ....... *G06Q 30/0255* (2013.01); *G06F 3/0485* (2013.01); *G06F 3/04842* (2013.01); *G06F 3/04847* (2013.01); *G06Q 30/0267* (2013.01); *G06F 2203/011* (2013.01); *H04L 67/1097* (2013.01); *H04L 67/2842* (2013.01)

(58) Field of Classification Search
CPC ............ G06Q 30/0255; G06Q 30/0267; G06F 3/0482; G06F 3/04847; G06F 3/0485; G06F 2203/011; H04L 67/1097; H04L 67/2842

See application file for complete search history.

(56) References Cited

U.S. PATENT DOCUMENTS

| | | | | |
|---|---|---|---|---|
| 9,633,378 | B1* | 4/2017 | Nath ................... | G06Q 30/0277 |
| 2006/0149710 | A1* | 7/2006 | Koningstein ..... | G06F 17/30867 |
| 2008/0313029 | A1* | 12/2008 | Evans .................... | G06Q 30/02 |
| | | | | 705/14.53 |
| 2011/0314051 | A1* | 12/2011 | Cavet ................ | G06F 17/30017 |
| | | | | 707/769 |
| 2014/0048874 | A1* | 2/2014 | Zhang .................. | H01L 27/088 |
| | | | | 257/336 |
| 2014/0074601 | A1* | 3/2014 | Delug .................... | G06Q 30/02 |
| | | | | 705/14.53 |

(Continued)

OTHER PUBLICATIONS

Deep Linking in the World Wide Web, available at https://www.w3.org/2001/tag/doc/deeplinking.html (2003).*

(Continued)

*Primary Examiner* — Raquel Alvarez
(74) *Attorney, Agent, or Firm* — Jaffery Watson Mendonsa & Hamilton LLP (57) ABSTRACT

Methods and systems are described for providing advertising services to devices with dynamic ad creative deep linking. In one embodiment, an advertising system includes a storage medium to store one or more software programs of an ad server and processing logic of the ad server that is coupled to the storage medium. A dynamic ad creative deep linking unit is configured to receive an ad campaign including at least one video ad from the ad server and to generate a customized deep link for a targeted software application or targeted content of the at least video ad based on installed applications of a device, application usage history of the installed applications, and metadata associated with at least one of the installed applications.

18 Claims, 6 Drawing Sheets

(56) References Cited

U.S. PATENT DOCUMENTS

| | | | |
|---|---|---|---|
| 2014/0278853 A1* | 9/2014 | Brown | G06Q 30/0209 705/14.12 |
| 2015/0025981 A1* | 1/2015 | Zaretsky | G06F 17/30887 705/14.73 |
| 2015/0081435 A1* | 3/2015 | Griffiths | G06Q 30/0255 705/14.53 |
| 2015/0154644 A1* | 6/2015 | Saxena | G06Q 30/0269 705/14.66 |
| 2015/0156061 A1* | 6/2015 | Saxena | H04W 4/003 715/733 |
| 2015/0293977 A1* | 10/2015 | Perl | G06Q 30/0256 705/14.54 |

OTHER PUBLICATIONS

Gluck, M. "IAB Ad Engagement", Radar Research, 15 pages, Dec. 5, 2012.

"Mobile Deep Linking", downloaded from Wkipedia, the free encyclopedia on Feb. 17, 2015, 3 pages.

* cited by examiner

SYSTEMS AND METHODS FOR PROVIDING ADVERTISING SERVICES TO DEVICES WITH DYNAMIC AD CREATIVE DEEP LINKING

FIELD OF THE INVENTION

Embodiments of the invention are generally related to systems and methods for providing advertising services to devices with dynamic ad creative deep linking.

BACKGROUND

Mobile advertising is a form of advertising via mobile (wireless) phones or other mobile devices. Advertisements (ads) can be presented to the intended user in the form of banner ads, text boxes, and video ads. However, these ads may be difficult to distribute to a targeted user in a timely manner and the user may not be responsive and interested in the ads.

SUMMARY

Methods and systems are described for providing advertising services to devices with dynamic ad creative deep linking. In one embodiment, an advertising system for delivering advertising services with dynamic ad creative deep linking to devices includes a storage medium to store one or more software programs of an ad server and processing logic of the ad server that is coupled to the storage medium. The processing logic is configured to execute instructions of the one or more software programs of the ad server and a dynamic ad creative deep linking unit of the ad server is coupled to the processing logic. The dynamic ad creative deep linking unit is configured to receive an ad campaign including at least one video ad from the ad server and to generate a customized deep link for a targeted software application or targeted content of the at least video ad based on installed applications of a device, application usage history of the installed applications, and metadata associated with at least one of the installed applications.

The processing logic of the ad server is configured to execute instructions to receive an ad request from the device upon a user of the device initiating a software application on the device and send the ad campaign having the at least one video ad with the customized deep link to the device in response to the ad request.

Other embodiments are also described. Other features of embodiments of the present invention will be apparent from the accompanying drawings and from the detailed description which follows.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Methods and systems are described for providing advertising services to devices with dynamic ad creative deep linking. In one embodiment, an advertising system for delivering advertising services with dynamic ad creative deep linking to devices includes a storage medium to store one or more software programs of an ad server and processing logic of the ad server that is coupled to the storage medium. The processing logic is configured to execute instructions of the one or more software programs of the ad server and a dynamic ad creative deep linking unit of the ad server is coupled to the processing logic. The dynamic ad creative deep linking unit is configured to receive an ad campaign including at least one video ad from the ad server and to generate a customized deep link for a targeted software application or targeted content of the at least video ad based on installed applications of a device, application usage history of the installed applications on the device, and metadata associated with at least one of the installed applications on the device.

The processing logic of the ad server is configured to execute instructions to receive an ad request from the device upon a user of the device initiating a software application on the device and send the ad campaign having the at least one video ad with the customized deep link to the device in response to the ad request.

An auction system provides a mechanism for third party participants to bid on providing advertising services including in-application (in-app) advertising services to the device in response to an actual or predictive ad exchange request. The auction system captures demand for providing advertising services in real time or near real time prior to the actual or the predicted ad play event on the device.

In mobile video advertising, high performing campaigns are needed for advertisers, publishers, and users of the publishers. Advertisers include organizations that pay for advertising services including ads on a publisher network of applications and games. Publishers provide content for users. Publishers can include developers of software applications, mobile applications, news content, gaming applications, sports news, etc. The publishers are interested in generating revenue through selling ad space to be on displayed in video ads to their users.

Performance can be defined in terms of click-through rates (CTR), conversion rates, and video completion rates. The process in which a user selects an ad is referred to as a click-through, which is intended to encompass any user selection. The ratio of a number of click-throughs to a number of times an ad is displayed is referred to as the CTR of the ad. A conversion occurs when a user performs a transaction related to a previously viewed ad. For example, a conversion may occur when a user views a video ad and installs an application being promoted in the video ad. A conversion may occur when a user views a video ad and installs an application being promoted in the video ad within a certain time period. A conversion may occur when a user is shown an ad and decides to make a purchase on the advertiser's web site within a certain time period. The ratio of the number of conversions to the number of times an ad is displayed is referred to as the conversion rate. A video completion rate is a ratio of a number of video ads that are displayed to completion to a number of video ads initiated on a device. Advertisers may also pay for their ads through an advertising system in which the advertiser bid on ad placement on a cost-per-click (CPC), cost-per-mille (CPM), cost-per-completed-view (CPCV), cost-per-action (CPA), and/or cost-per-install (CPI) basis. A mille represents a thousand impressions.

In this section several embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

Figure 1:
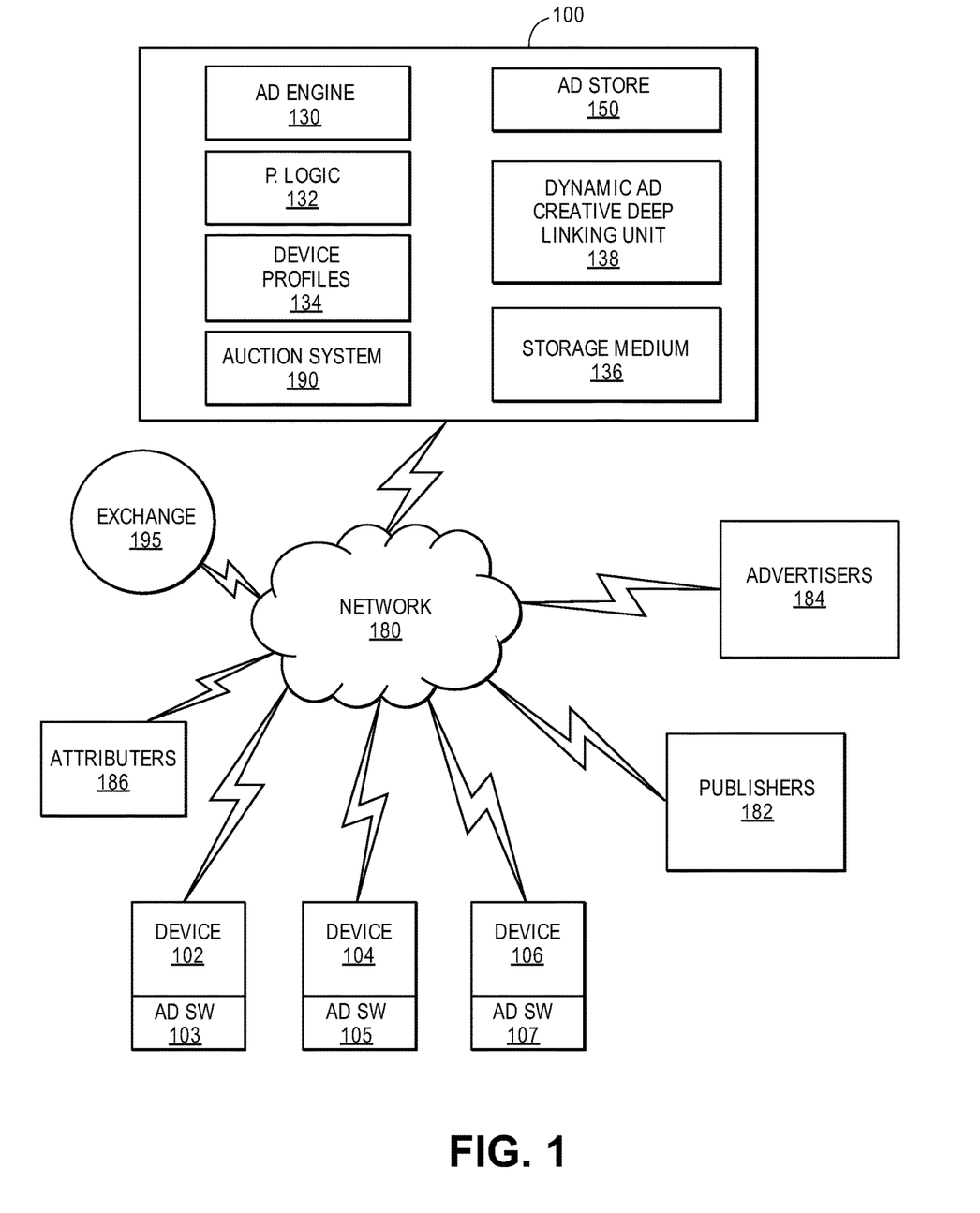
FIG. 1 shows an embodiment of a block diagram of a system 100 for providing advertising services to devices with dynamic ad creative deep linking in accordance with one embodiment.

FIG. 1 shows an embodiment of a block diagram of an ad system 100 for providing advertising services to devices with customized deep linking in accordance with one embodiment. The ad system 100 includes an advertising engine 130, processing logic 132, device profiles 134, storage medium 136, an ad store 150, a dynamic ad creative deep linking unit 138, and an auction system 190. The auction system 190 may be integrated with the ad system or separate from the ad system. The system 100 provides advertising services (e.g., ad campaigns for delivering in-app video ads to mobile devices, ad campaigns for delivering in-app video ads to any type of device) for advertisers 184 to devices 102, 104, and 106 (e.g., source device, client device, mobile phone, tablet device, lap top, computer, connected or hybrid television (TV), IPTV, Internet TV, Web TV, smart TV, satellite device, satellite TV, automobile, airplane, etc.). A device profile for a device is based on one or more parameters including location (e.g., GPS coordinates, IP address, cellular triangulation, etc.) of the device, a social profile for a user of the device, and categories or types of applications installed on the device. Each device includes a respective advertising services software 103, 105, 107 (e.g., a software development kit (SDK)) that includes a set of software development tools for advertising services including in-app advertising services (e.g., advertising services delivered within mobile applications, advertising services delivered within non-web browser applications). In-app ad campaigns are ad campaigns (e.g., video ads) served to devices in-app (e.g., within mobile applications on a mobile device, within non-web browser software applications on a device, etc). The publishers 182 publish content along with selling ad space to advertisers. Attributers 186 may install software (e.g., software development kits of publishers) on client devices and track user interactions with publisher applications and advertisements. The attributers can then share this user data with the system 100 and the appropriate publishers and advertisers. The system 100, devices 102, 104, 106, advertisers 184, publishers 182, attributers 186, and an ad exchange 195 with third party exchange participants communicate via a network 180 (e.g., Internet, wide area network, WiMax, satellite, cellular, IP network, etc.). The third party exchange participants can bid in real time or approximately in real time (e.g., 1 hour prior to an ad being played on a device, 15 minutes prior to an ad being played on a device, 1 minute prior to an ad being played on a device, 15 seconds prior to an ad being played on a device, less than 1 second prior to an ad being played on a device) using the auction system 190 to provide advertising services (e.g., an in-app video ad that includes a preview (e.g., video trailer) of an application, in-app ad campaigns for brand and performance advertisers) for the devices. The ad campaign(s) are then delivered from any ad source to targeted user devices (e.g., 102, 104, 106) via the network 180. The processing logic 132 may include a filtering functionality for filtering potential available ad campaigns, an optimizer functionality for determining an optimal ad campaign, and a selector (picker) functionality for selecting an optimal campaign. The filtering functionality may filter ad campaigns based on availability, device characteristics (e.g., device profiles 134, device id to uniquely identify a device, make and model of a user's device, network connection for user's device, whether user's device is mobile device or tablet device, OS version, volume, screen size and orientation, language setting, etc.), and user characteristics (e.g., age, gender, ethnicity, location, etc.), etc.

In one embodiment, the system 100 includes a storage medium 136 to store one or more software programs. Processing logic (e.g., 132) is configured to execute instructions of at least one software program to receive an advertising request from a device upon the device having an ad play event for an initiated software application and associated advertising services software (e.g., software development kit (SDK)) on the device. The processing logic is further configured to send a configuration file to the device in response to the configuration call. The configuration file includes different options for obtaining at least one advertisement (ad) to play on the device during an ad play event. The options include playing at least one ad cached on the device, obtaining at least one ad from an ad store of the ad system 100, and obtaining at least one ad from an advertising exchange that includes $3^{rd}$ party participants.

In the context of mobile apps, deep linking consists of using a uniform resource identifier (URI) that links to a specific location within a mobile app (e.g., exampleApp://location/123456), rather than simply launching the app (e.g., exampleApp://). Depending on the mobile device, the URI required to trigger the app may be different (e.g., exampleOS_type#1App://location/123456 versus exampleOS_type#2App://launch?location=123456) based on a type of operating system for a mobile device. The format of the URI used to trigger or deep link an app is often different depending on the mobile operating system.

In conventional ad networks, a user of a mobile device can click on a uniform resource locator (url) link of a mobile application and will be directed to a source landing web page (e.g., application service.com.idR34) to obtain a software application. However, the link needs to be coded into an application and the link will only work for a particular method of linking that depends on a device's operating system.

In contrast, in accordance with certain embodiments, the conventional url link is replaced with a custom deep link of the dynamic ad creative deep linking unit 138, which is configured to receive an ad campaign including at least one video ad from the ad server and to generate a custom deep link for a targeted software application or targeted content of the at least one video ad based on installed applications of a device, application usage history of the installed applications of the device, and metadata associated with at least one of the installed applications of the device. The metadata associated with the at least one of the installed applications includes content tags relating to content requested based on a search query within at least one of the installed applications. An ad creative provides a look and feel of one or more user interfaces of an ad campaign. The customized deep link is based on a standard method for deep linking if available or will be customized based on the OS of the device or the type of application. The dynamic ad creative deep linking unit 138 provides improved computer functionality in being able to customize a deep link option within a video ad for a user based on user preferences such as previous app installs, search queries, etc. In this manner, the user does not need to repeat operations of opening an application, performing another search query, and then access a desired location within the opened application. The user experience and user interaction is enhanced by removing friction with the custom deep link. The user is able to more easily access with less delay a desired targeted application or content which can be a desired product or service. The custom deep link option of a video ad for a first advertiser or developer may enhance a conversion of a product or service for a second advertiser or developer. For example, a video ad for an ecommerce application in general may provide a specific custom deep link option for accessing a product or service of a different advertiser or publisher.

Figure 2:
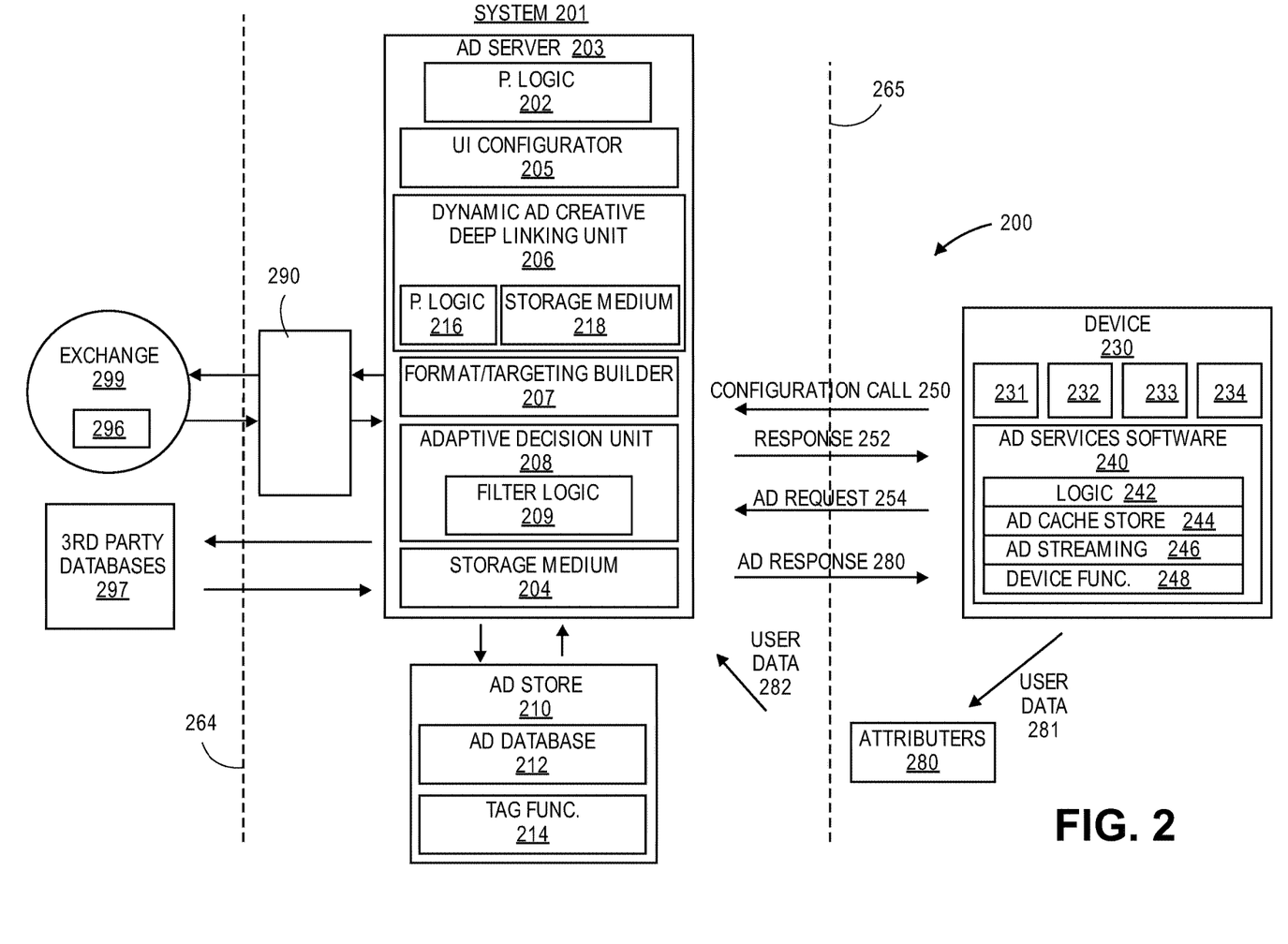
FIG. 2 illustrates a flow diagram of operations for providing advertising services including ads or ad campaigns to devices with dynamic ad creative deep linking in accordance with one embodiment.

FIG. 2 illustrates a flow diagram of operations for providing advertising services including ads or ad campaigns to devices with dynamic ad creative deep linking in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, an advertising system performs the operations of method 200. The ad system 201 and ad server 203 may include special purpose computers, which are designed or programmed to perform only advertising or publisher relating functions such as customized deep linking for ad campaign functions and ad serving functions for serving ads with customized deep linking to client devices.

In one example, vertical dashed lines 264 and 265 represent a separation of the components of the system 201 (e.g., ad server 203, auction system 290, ad store 210, etc.) and components external to the system 201 (e.g., device 230, attributers 280, exchange 299, third party databases 297). The components of the system 201 communicate with the components external to the system via a network (e.g., network 180).

A device 230 (e.g., source device, client device, mobile device, mobile phone, tablet device, lap top, computer, connected or hybrid television (TV), IPTV, Internet TV, Web TV, smart TV, etc) initiates a software application (e.g., at least one of software applications 231-234, at least one of mobile software applications 231-234). For example, a user may select one of the software applications. The advertising services software 240 is also initiated upon the initiation of one of the software applications. The advertising services software 240 may be associated with or embedded with the software applications. The advertising services software 240 may include or be associated with logic 242 (e.g., communication logic for communications such as an ad request), an ad cache store 244 for storing one or more ads or ad campaigns with customized deep linking, ad streaming functionality 246 for receiving, optionally storing, and playing streamed ads, and device functionality 248 for determining customized deep linking, device and connection capabilities (e.g., type of connection (e.g., 4G LTE, 3G, 5G, WiFi, WiMax, etc.), bandwidth of connection, location of device, type of device, display characteristics (e.g., pixel density, color depth), etc.). The initiated software application or advertising services software may have an ad play event for displaying or playing an ad in-app on the display of the device. At operation 250, processing logic 202 of an ad server 204 of system 201 receives a configuration call from the device 230 upon the initiation of the software application and associated advertising services software 240. At operation 252, the processing logic 202 sends a response that includes at least one configuration file to the device 230 in response to the configuration call. The at least one configuration file includes different options for obtaining an ad to play for the ad play event. In one embodiment, a first option includes playing at least one ad that is cached on the device 230 during the ad play event. A second option includes planning to play at least one ad that is cached on the device 230 but asking for at least one better ad from the system 201. If the system 201 obtains and delivers at least one better ad in a timely manner (e.g., in time for a predicted ad play event, within a time period set by the at least one configuration file) then the at least one better ad will play during the predicted ad play event. The at least one better ad is expected to have a higher conversion rate or higher likelihood of obtaining a user interaction than the at least one cached ad. Otherwise, the cached ad is played. A third option includes planning to play at least one ad that is cached on the device 230 but asking for at least one better ad from the exchange 299 via an auction system 290. If the exchange 299 including third party databases 296 provides at least one better ad in a timely manner then the better ad having a predicted higher conversion rate will play during the ad play event. Otherwise, the cached ad is played. A fourth option includes planning to play at least one ad that is cached on the device 230 but asking for at least one better ad from the system 201 or the exchange 299. If the system 201 or the exchange 299 provide at least one better ad in a timely manner then the better ad having a predicted higher conversion rate will play during the ad play event. Otherwise, the cached ad is played.

A fifth option includes streaming at least one ad to be played during the predicted ad play event to the device 230. A sixth option includes planning to play at least one ad that is streamed to the device 230 but asking for at least one better ad from the system 201. If the system 201 provides the at least one better ad having a predicted higher conversion rate in a timely manner (e.g., in time for the ad play event, within a time period set by the configuration file) then the better ad will play during the ad play event. Otherwise, the planned streamed ad is played. A seventh option includes planning to play at least one ad that is streamed to the device 230 but asking for at least one better ad from the exchange 299. If the exchange 299 provides a better ad having a predicted higher conversion rate in a timely manner then the better ad will play during the ad play event. Otherwise, the planned streamed ad is played. An eighth option includes planning to play at least one ad that is streamed to the device 230 but asking for at least one better ad from the system 201 or the exchange 299. If the system 201 or the exchange 299 provide a better ad having a predicted higher conversion rate or predicted higher user engagement in a timely manner then the better ad will play during the predicted ad play event. Otherwise, the planned streamed ad is played. In others embodiments, the configuration file includes a subset of the options 1-8, additional options for obtaining at least one ad or ad campaign, or different options (e.g., options that include potential caching and streaming operations).

The configuration file can be altered by the system 201 or the device 230 without affected the advertising services software 240. In particular, the configuration file can be altered without affecting a version of the advertising services software 240 such that a user does not need to update a version of the advertising services software even if the configuration file changes. The system 201 is designed to deliver the most relevant and highest converting ads or most likely to cause user engagement or interaction with customized deep linking to devices using the configuration file.

At operation 254, prior to a predicted ad play event or an actual ad play event, the processing logic of the ad server optionally receives an ad request with a configurable option (e.g., options 1-8) of the at least one configuration file based on an anticipated ad play event occurring in the near future (e.g., 1 hr, 15 minutes, 60 seconds, 10 seconds, etc.). The ad request may be a predictive ad request if it occurs prior to a predicted ad play event. Alternatively, the ad server generates an ad request based on receiving the configuration call, which indicates that the user has initiated a software application and an anticipated ad play event will likely occurring in the near future even though no ad request is received from the device.

The ad request includes different types of information including publisher settings (e.g., a publisher of the selected software application), an application id to identify the selected software application, placement information for timing placement of an ad in-app (e.g., within mobile applications on a mobile device, within non-web browser software applications on a device, etc), user characteristics, device characteristics (e.g., device id to uniquely identify a device, make and model of a user's device, network connection for user's device, whether user's device is mobile device or tablet device, OS version, volume, screen size and orientation, language setting), geographical data, location data, motion data (e.g., motion data from an accelerometer or gyroscope), language, time, application settings, demographic data for the user of the device, session data (e.g., how long a user has been using the selected application), and cache information.

The ad server may also process the ad request (or predictive ad request) using the adaptive algorithms (e.g., machine learning models) of the adaptive decision unit 208 to determine an ad campaign for serving to the device. Filter logic 209 may include geo-location data and cost budgets of publishers for different bid strategies (e.g., CPM, CPC, CPI, CPA, CPCV). The filter logic filters eligible ad campaigns and selects more attractive ad campaigns that are more likely to cause user interaction, user engagement, and generate more revenue. The selected candidate ad campaigns are sent to a data science pipeline that includes machine learning models. In one example, the selected candidate ad campaigns are sent to machine learning models that are located on prediction server(s) of the ad system 201 for analysis and modeling. The machine learning models can assign a value to each bid strategy and convert each bid strategy into an effective CPM strategy. For example, a CPI strategy is converted into a CPM strategy such that all bid strategies can be compared to each other in terms of effective CPM. The machine learning models build algorithms based on learned data rather than relying on explicitly programmed rules.

Different predicted parameters including predicted conversion rates (e.g., a probability of a user selecting a software application (e.g., mobile software application) for installation on the user's device, a probability of a user clicking on an option provided by a software application (e.g., mobile software application) on the user's device, a probability of a click per mille (thousand impressions), a predicted life time value of a user) for different candidate ad campaigns are sent from the prediction server(s) to the ad server (or machine learning models provide selected ad campaign to ad server). The ad server may then apply additional filters of filter logic 209 such as business rules, publisher targeting objectives, and advertiser targeting objectives to the predicted parameters in order to select an optimal ad campaign.

The dynamic ad creative deep linking unit 206 includes processing logic 216 (e.g., one or more processing units) for executing instructions to receive an ad campaign including at least one video ad from the ad server and to generate a customized deep link for a targeted software application or targeted content of the at least video ad based on installed applications of a device, application usage history of the installed applications of the device, and metadata associated with at least one of the installed applications of the device. The metadata associated with the at least one of the installed applications includes content tags relating to content requested by a user based on a search query (or search queries) within at least one of the installed applications. The metadata may also include genre, age ratings, reviews, downloads, related applications, version, file size, whether the application(s) is compatible with certain types of devices, developer website, developer applications, etc. for the targeted software application associated with the video ad.

In one example, the customized deep link for a targeted software application or targeted content of the at least one video ad provides access to customized features or content of the targeted software application. In another example, the customized deep link for a targeted software application or targeted content of the at least one video ad provides access to customized features or content of the targeted software application based on the content tags relating to content requested based on a search query within at least one of the installed applications.

In one embodiment, the customized deep link for a targeted software application or targeted content of the at least one video ad provides access to the targeted content within the at least one installed application based on the content tags relating to content requested based on a search query within the at least one installed application.

The selected ad campaign with the customized deep linking is then delivered to the device at operation 280. The ad campaign can be obtained from the ad server, an auction system 290, an ad exchange 299, third party databases 297, or an ad store 210 that includes an ad database 212 having ad campaigns and ads. The ad store may optionally provide access to third party ad databases 297 via tag functionality 214.

In one embodiment, the exchange is a private exchange that includes a limited number of private participants. The private exchange may be accessed in combination with accessing ads from the ad store and optionally with accessing ads from third party databases via ad serving tags. In another embodiment, the exchange is a public exchange that includes a limited number of public participants or an unlimited number of participants that meet the requirements of the configurable parameters. The public exchange may be accessed in combination with accessing ads from the ad store and optionally with accessing ads from third party databases via ad serving tags.

In a conventional ad network, a user initiates a software application on a mobile device and then the mobile device sends an ad request to the ad network. The ad network responds with an ad response. The mobile device then caches the ad contained with the ad response and plays the ad from cache during an ad play event. However, better, fresher, more relevant, customized with deep link options, and adaptive ads (i.e., higher converting ads) may be available in comparison to the cached ad of the conventional ad network.

A user interface (UI) configurator 205 provides a custom scripting framework for publishers, developers, or advertisers to create and edit fully customizable ad formats. The UI configurator can create web pages using hypertext markup language (html) and cascade style sheets (CSS). The framework provides publishers unlimited flexibility over the look and feel of their ad integration. For example, a publisher can add a frame around a video ad if desired or the publisher can add an opt in interstitial after a certain level of a software application. An opt in interstitial provides the user the option of viewing an advertisement. There is no need to update an application on a client device because the format changes are handled with the ad server 203. The UI configurator may include a software development kit (SDK) or software tools. The SDK or software tools may be loaded on the device.

The ad format and targeting builder unit 207 may communicate with the UI configurator or be a separate unit. The ad format and targeting builder unit 207 allows a publisher or developer to create a new custom ad format while targeting the ad for one or more user segments, perform testing of different ad formats or timing placements, and launch in app without leaving a UI (e.g., dashboard) provided by the system 201. Any changes or edits for any aspect of the ad services are performed on the ad system. The advertising services software can be integrated with a software application of the publisher or developer and updated with any type of customized adaptive user experience without the user needing to update the software application of the publisher or developer. The ad format and targeting builder provides the following options to developers and publishers: custom scripting for fully custom look and feel; support for frames for an ad; video size options (e.g., full screen, partial screen, etc.); video length options (e.g., 15 seconds, 30 seconds, long form, all of these options, etc.); opt-in or autoplay ad options; skippable or forced ad options; muted, unmuted, or partial volume options; portrait or landscape options for the UI of a device, target user segments (e.g., non-payers, payers, highest payers; new users, loyal users, at risk users; high, medium, and low engagement users; advanced, intermediate, and beginner users); demand source options (e.g., hosted 1st party ad content, third party ad content, direct sold ads (e.g., direct sold ads between ad system and advertisers), ad exchange, programmatic brand ads, programmatic performance ads); and monetization options (e.g., video ad, in-app purchase), determined by the system 201, for best monetization mechanism for a specific user based on most likely conversion rate for video ad and in-app purchase. Alternatively, no monetization mechanism may be determined or used by the system 201.

Attributers 280 may have software (e.g., a SDK of the publisher of the application) installed on the user's device in order to obtain third party user data (e.g., user data 281 from the device 230). This user data may include tracking of a user's interaction and engagement with the software application, a length of time that the application is installed, an amount of purchases from the application, and buying patterns in terms of which products or services are purchased and when these products or services are purchased. An engagement rate indicates how engaged a user is with an ad in terms of cognitive (e.g., awareness, interest), physical (e.g., user-initiated transaction), and emotional factors. In one example, engagement with an ad video is measured in terms of play rate, playthrough rate, completion rates, video viewing time, and share rates. In another example, rich media engagement is measured in terms of display times, expansions, expansion times, interaction time and rate, form responses, game play, and share rates. In another example for mobile devices, engagement includes click to call, retail location, interaction rates, click to download, click to play, and share rates. The user data may also include monitoring target goals for how the user engages with the application. The user data (e.g., user data 282) can be shared with system 201, publishers, and advertisers.

In one example, closing a video ad at an earliest opportunity can be interpreted as a negative emotion in regards to the video ad. A user's interaction with hardware (e.g., display device, motion device, gyroscope, accelerometer, smart watch, heart rate monitor, blood pressure sensor, etc.) may also be used to infer an emotional state of the user. For example, a user can interact with an interactive end card of an ad campaign by touching numerous touch points on a display device of a device to indicate an emotional state. A user can move the device in a certain shape or pattern that can be detected by a motion device.

Figure 3:
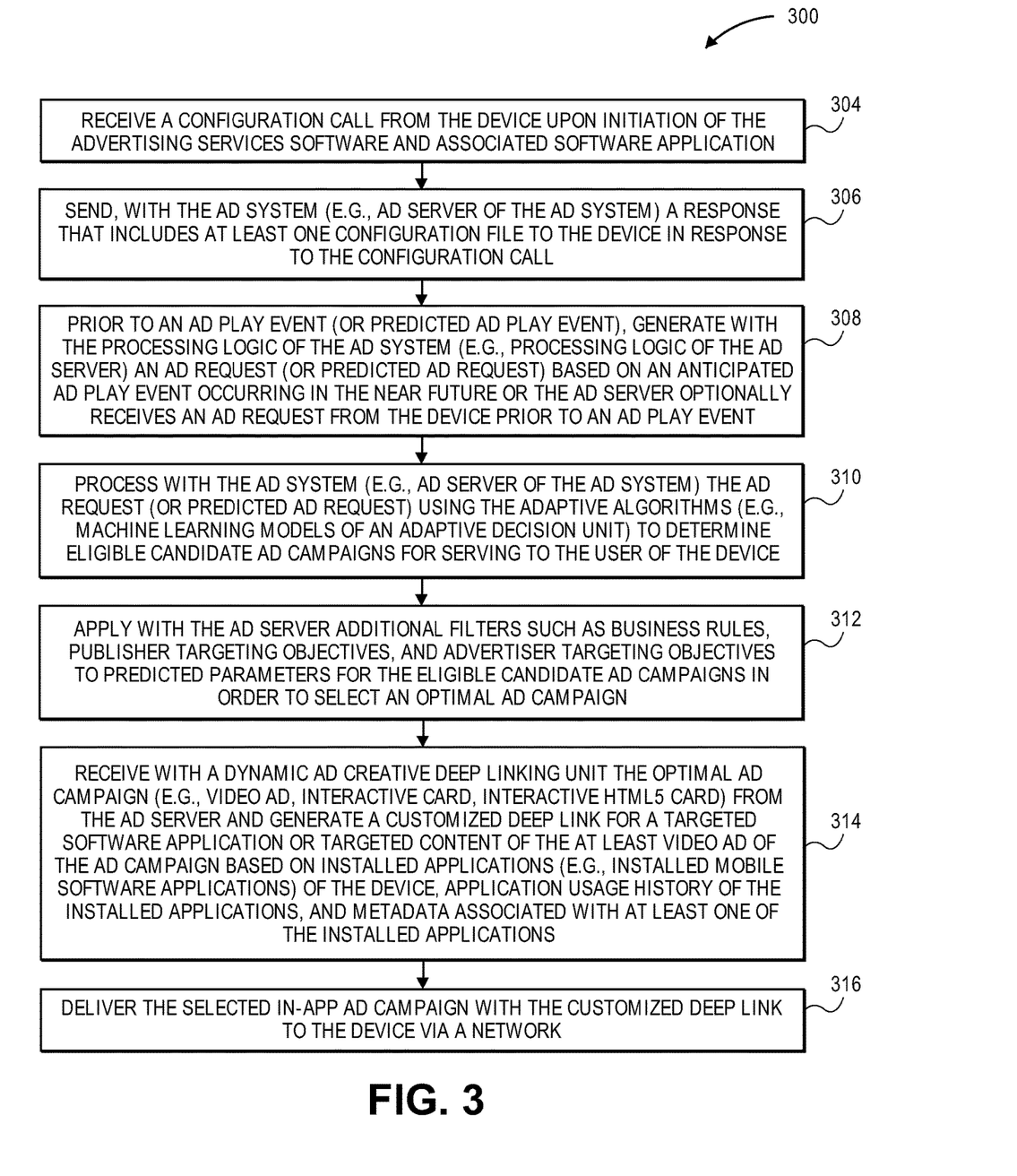
FIG. 3 illustrates flow diagrams of operations for a method of providing advertising services including ads or ad campaigns to devices with dynamic ad creative deep linking in accordance with one embodiment.

FIG. 3 illustrates a flow diagram of operations for a method of providing advertising services including ads or ad campaigns to devices with dynamic ad creative deep linking in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, an advertising system (e.g., ad server, dynamic ad creative deep linking unit) performs the operations of method 300. The ad system communicates with a device, attributers, an exchange, and a third party database via a network (e.g., network 180).

In one embodiment, a device initiates a software application. For example, a user may select one of the software applications. The advertising services software (e.g., SDK) is also initiated upon the initiation of the software application. The advertising services software may be associated with or embedded with the software application. The advertising services software may include or be associated with logic 242, an ad cache store 244, ad streaming functionality 246, and device functionality 248 of device 230. The initiated software application may have an actual ad play event or a predicted ad play event at a future time for displaying or playing an ad on the display of the device. At operation 304, an ad system (e.g., ad server of the ad system) receives a configuration call from the device upon the initiation of the advertising services software and associated software application. At operation 306, the ad system (e.g., ad server of the ad system) sends a response that includes at least one configuration file to the device in response to the configuration call. The at least one configuration file includes different options (e.g., options 1-8 as described in conjunction with the description of FIG. 2) for obtaining an ad to play for the ad play event that is predicted to occur in the future.

At operation 308, prior to an ad play event (or predicted ad play event), the processing logic of the ad system (e.g., processing logic of the ad server) generates an ad request (or predicted ad request) based on an anticipated ad play event occurring in the near future (e.g., 1 hr, 15 minutes, 60 seconds, 10 seconds, etc.) or the ad server optionally receives an ad request from the device prior to an ad play event. Receiving the at least one configuration call from the device indicates that the user has initiated a software application and an anticipated ad play event will likely occur in the near future even if no predicted ad request is received from the device.

At operation 310, the ad system (e.g., ad server of the ad system) processes the ad request (or predicted ad request) using the adaptive algorithms (e.g., machine learning models of an adaptive decision unit) to determine eligible candidate ad campaigns for serving to the user of the device. The selected candidate ad campaigns can be sent to a data science pipeline that includes machine learning models. The selected candidate ad campaigns may be sent to machine learning models that are located on prediction server(s) 220 (or adaptive decision unit) for analysis and modeling. Different predicted parameters including predicted conversion rates (e.g., a probability of a user selecting an option of a video ad for installing a software application on the user's device, a probability of a user clicking on an option provided by a software application on the user's device, a probability of a click per mille (thousand impressions), a predicted life time value of a user) for different candidate ad campaigns are sent from the prediction server(s) 220 to the ad server (or machine learning models of adaptive decision unit provide selected ad campaign to ad server). At operation 312, the ad server may then apply additional filters such as business rules, publisher targeting objectives, and advertiser targeting objectives to the predicted parameters in order to select an optimal ad campaign.

At operation 314, a dynamic ad creative deep linking unit receives the optimal ad campaign (e.g., video ad, interactive card, interactive html5 card) from the ad server and generates a customized deep link for a targeted software application or targeted content of the at least video ad of the ad campaign based on installed applications (e.g., installed mobile software applications) of the device, application usage history of the installed applications, and metadata associated with at least one of the installed applications. The metadata associated with the at least one of the installed applications on the device may include content tags. The content tags may relate to content requested by a user based on a search query within at least one of the installed applications. The metadata may also include genre, age ratings, reviews, downloads, related applications, version, file size, compatible with certain types of devices, developer website, developer applications, etc. for the targeted software application associated with the video ad. The selected in-app ad campaign with the customized deep link is then delivered to the device via a network at operation 316.

In one example, the customized deep link for a targeted software application or targeted content of the at least one video ad provides access to customized features or content of the targeted software application. In another example, the customized deep link for a targeted software application or targeted content of the at least one video ad provides access to customized features or content of the targeted software application based on the content tags relating to content requested based on a search query within at least one of the installed applications.

In one embodiment, a user has initiated a first software application and a video ad with the customized deep link is displayed in-app within the first software application. The video ad is promoting a second software application that has been installed on the device or a website (e.g., ecommerce marketplace website) for the second software application which has recently been accessed. The user has recently performed a search query for a specific product or service using the second software application, the website for the second software application, or the user has used a different means (e.g., web browser search history, social media messaging and data, search for a similar product or service) for indicating a user preference or interest in the specific product or service. The ad system obtains the metadata associated with the installed software applications (e.g., installed non-web browser applications, installed web browser applications) and any search queries performed with these installed applications in order to generate the customized deep link that is associated with or embedded with the video ad. The user can then select the customized deep link and will be directed to targeted content within the second application. In one example, the user is directed to a specific product or service within an ecommerce marketplace app based on a previous search query or queries for the specific product or service. In another example, the user is directed to targeted content (e.g., search results, flight info for a flight from a first city to a second city) within the second application (e.g., a travel app) based on a user previously searching for flight info for a flight from a first city to a second city within the second application, a website associated with the second application, or within a web browser application. The custom deep link may have the following format for a method of deep linking for one or more device types or OS types:

```
deep linking in standard manner/. . . search query for flight info
from travel app
    deep linking for first OS type/. . . search query for flight info
    from travel app
    deep linking for second OS type/. . . search query for flight info
from travel app
```

In one embodiment, the customized deep link for a targeted software application or targeted content of the at least one video ad provides access to the targeted content within the at least one installed application based on the content tags relating to content requested based on a search query within the at least one installed application.

Figure 4:
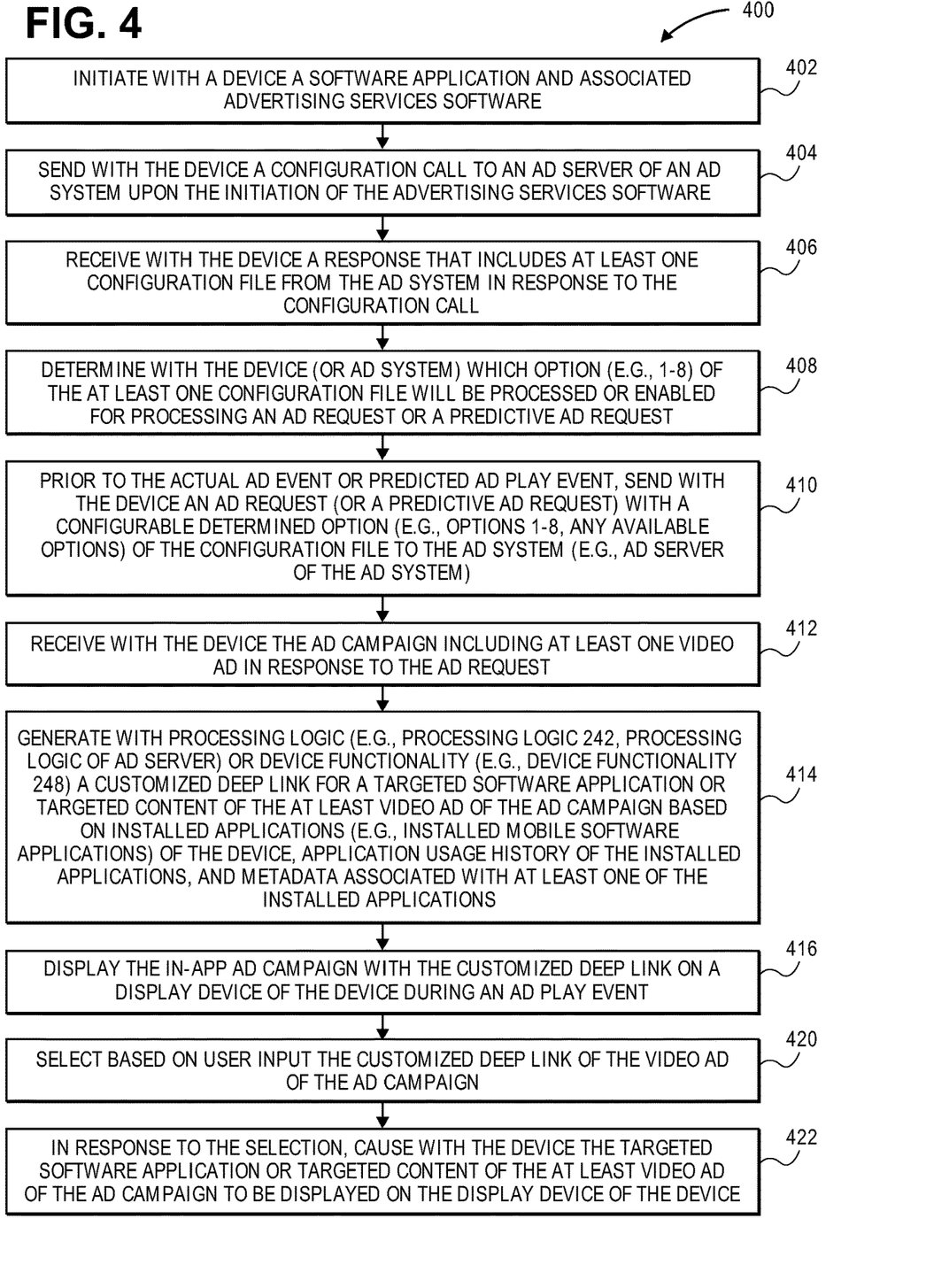
FIG. 4 illustrates a flow diagram of operations for a method of providing advertising services including ads or ad campaigns to devices with dynamic ad creative deep linking in accordance with one embodiment.

FIG. 4 illustrates a flow diagram of operations for a method of providing advertising services including ads or ad campaigns to devices with dynamic ad creative deep linking in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a device performs the operations of method 400. The device communicates with the ad system via a network (e.g., network 180).

In one embodiment, a device initiates a software application at operation 402. For example, a user may select one of the software applications. The advertising services software (e.g., SDK) is also initiated upon the initiation of the software application. The SDK may be associated with or embedded with the software application. The advertising services software may include or be associated with logic 242, an ad cache store 244, ad streaming functionality 246, and device functionality 248 of device 230. The initiated software application may have an ad play event for displaying or playing an ad on the display of the device. At operation 404, the device sends a configuration call to an ad server of an ad system upon the initiation of the advertising services software. At operation 406, the device receives a response that includes at least one configuration file from the ad system in response to the configuration call. The at least one configuration file includes different options (e.g., options 1-8 as described in conjunction with the description of FIG. 2) for obtaining at least one ad to play for an actual ad play event or a predicted ad play event that is predicted to occur in the future.

At operation 408, the device (or ad system) determines which option (e.g., 1-8) of the at least one configuration file will be processed or enabled for processing an ad request or a predictive ad request. At operation 410, prior to the actual ad event or predicted ad play event, the device sends an ad request (or a predictive ad request) with a configurable determined option (e.g., options 1-8, any available options) of the configuration file to the ad system (e.g., ad server of the ad system). The ad system (e.g., ad server of the ad system) processes the ad request (or predictive ad request) in order to determine an ad campaign (e.g., an optimal ad campaign in terms of likelihood of converting, an optimal ad campaign in terms of likelihood of user interaction and engagement) of at least one ad or interstitial ad played in-app based on the information contained in the predictive ad request or ad request.

At operation 412, the device receives the ad campaign including at least one video ad in response to the ad request. At operation 414, the device (or ad system), with processing logic (e.g., processing logic 242) or device functionality (e.g., device functionality 248), generates a customized deep link for a targeted software application or targeted content of the at least video ad of the ad campaign based on installed applications (e.g., installed mobile software applications) of the device, application usage history of the installed applications, and metadata associated with at least one of the installed applications. The metadata associated with the at least one of the installed applications on the device may include content tags relating to content requested by a user based on a search query or queries within at least one of the installed applications. The metadata may also include genre, age ratings, reviews, downloads, related applications, version, file size, compatible with certain types of devices, developer website, developer applications, etc. for the targeted software application associated with the video ad. The in-app ad campaign with the customized deep link is then displayed on a display device of the device during an ad play event at operation 416. The user then selects the customized deep link of the video ad of the ad campaign at operation 420. In response to the selection, the device causes the targeted software application or targeted content of the at least one video ad of the ad campaign to be displayed on the display device of the device at operation 422.

In one example, the customized deep link for a targeted software application or targeted content of the at least one video ad provides access to customized features or content of the targeted software application. In another example, the customized deep link for a targeted software application or targeted content of the at least one video ad provides access to customized features or content of the targeted software application based on the content tags relating to content requested based on a search query within at least one of the installed applications. In one example, a user has initiated a first software application and a video ad with the customized deep link is displayed in-app within the first software application. The video ad is promoting a second software application that has been installed on the device or a website (e.g., ecommerce marketplace website) for the second software application has recently been accessed. The user has recently performed a search query for a specific product or service using the second software application or the website for the second software application. The ad system obtains the metadata associated with the installed software applications (e.g., installed non-web browser applications, installed web browser applications) and any search queries performed with these installed applications in order to generate the customized deep link that is associated with or embedded with the video ad. The user can then select the customized deep link and will be directed to targeted content within the second application. In one example, the user is directed to a specific product or service within an ecommerce marketplace app based on a previous search query for the specific product or service. In another example, the user is directed to targeted content (e.g., search results, flight info for a flight from a first city to a second city) within the second application (e.g., a travel app) based on a user previously searching for flight info for a flight from a first city to a second city within the second application, a website associated with the second application, or within a web browser application.

In one embodiment, the customized deep link for a targeted software application or targeted content of the at least one video ad provides access to the targeted content within the at least one installed application based on the content tags relating to content requested based on a search query within the at least one installed application.

The operations of FIGS. 2-4 can be altered, modified, combined, or deleted. For example, the operations 310 and 312 may be combined into a single operation for selecting an optimal ad campaign. In another example, the device determines and selects an optimal ad campaign without communicating with the ad system. In this example, the operations 404-412 are removed and replaced with one or more operations in which the device selects the optimal ad campaign. The methods in embodiments of the present invention may be performed with an apparatus or data processing system as described herein. In one example, the apparatus or data processing system may be a conventional, general-purpose computer system. In another example, the apparatus or data processing system is a special purpose computer(s), which are designed or programmed to perform only one function or a few functions with examples of a special purpose functionality including advertising targeting functionality, customized deep linking functionality, and ad delivery functionality.

Figure 5:
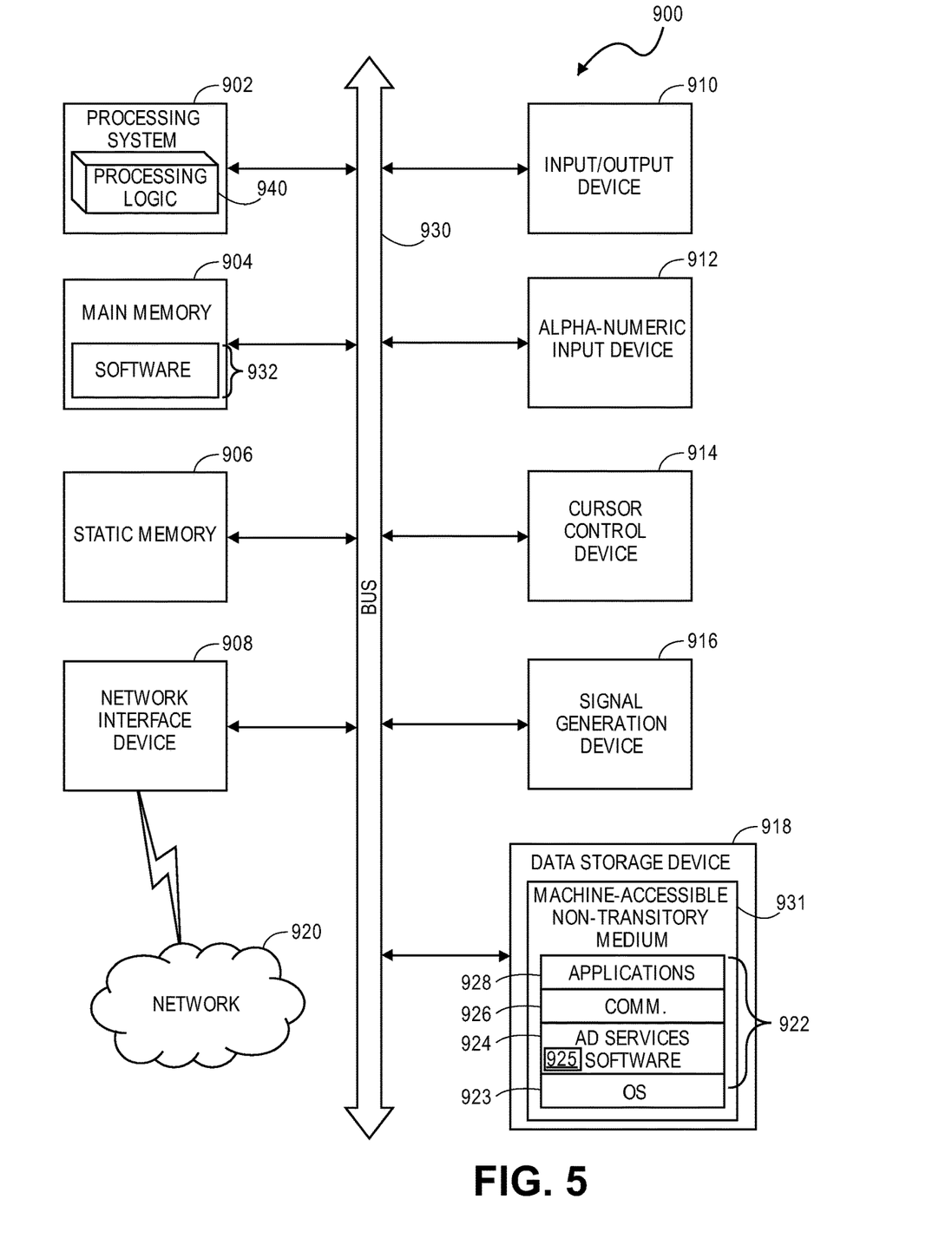
FIG. 5 illustrates a diagrammatic representation of a machine in the exemplary form of a device 900 within which a set of instructions, for causing the machine to perform any one or more of the methodologies discussed herein, may be executed in accordance with one embodiment.

FIG. 5 illustrates a diagrammatic representation of a machine in the exemplary form of a computer system or device 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a mobile device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary device 900 (e.g., system 100, system 201, device 230) includes a processing system 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing system 902 represents one or more general-purpose processing devices such as one or more microprocessors, central processing units, or the like. More particularly, the processing system 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system 902 may also be one or more special-purpose processing devices such as an application specific integrated circuit (ASIC), a field programmable gate array (FPGA), a digital signal processor (DSP), network processor, or the like. The processing system 902 is configured to execute the processing logic 926 for performing the operations and steps discussed herein.

The device 900 may further include a network interface device 908 that may include RF circuitry for sending and receiving RF cellular signals, a wireless transceiver for WiFi, a USB component, a NFC component, or any other communications component for sending and receiving communications. The device 900 also may include an input/output device 910 (e.g., a display, a liquid crystal display (LCD), a plasma display, a cathode ray tube (CRT), touch display device, or touch screen for receiving user input and displaying output), an optional alphanumeric input device 912 (e.g., a keyboard), an optional cursor control device 914 (e.g., a mouse), and a signal generation device 916 (e.g., a speaker).

The data storage device 918 may include a machine-accessible non-transitory medium 931 on which is stored one or more sets of instructions (e.g., software 922) embodying any one or more of the methodologies or functions described herein. The software 922 may include an operating system 923, advertising services software 924 (e.g., SDK 924), communications module 926, and applications 928 (e.g., publisher applications). The advertising services software 924 may include or be associated with dynamic ad creative deep linking functionality 925 for implementing operations of methods described herein. The software 922 may also reside, completely or at least partially, within the main memory 904 (e.g., software 932) and/or within the processing system 902 during execution thereof by the device 900, the main memory 904 and the processing system 902 also constituting machine-accessible storage media. The software 922 or 932 may further be transmitted or received over a network 920 via the network interface device 908.

The machine-accessible non-transitory medium 931 may also be used to store data structure sets that define user identifying states and user preferences that define user profiles. Data structure sets and user profiles may also be stored in other sections of device 900, such as static memory 906.

Figure 6:
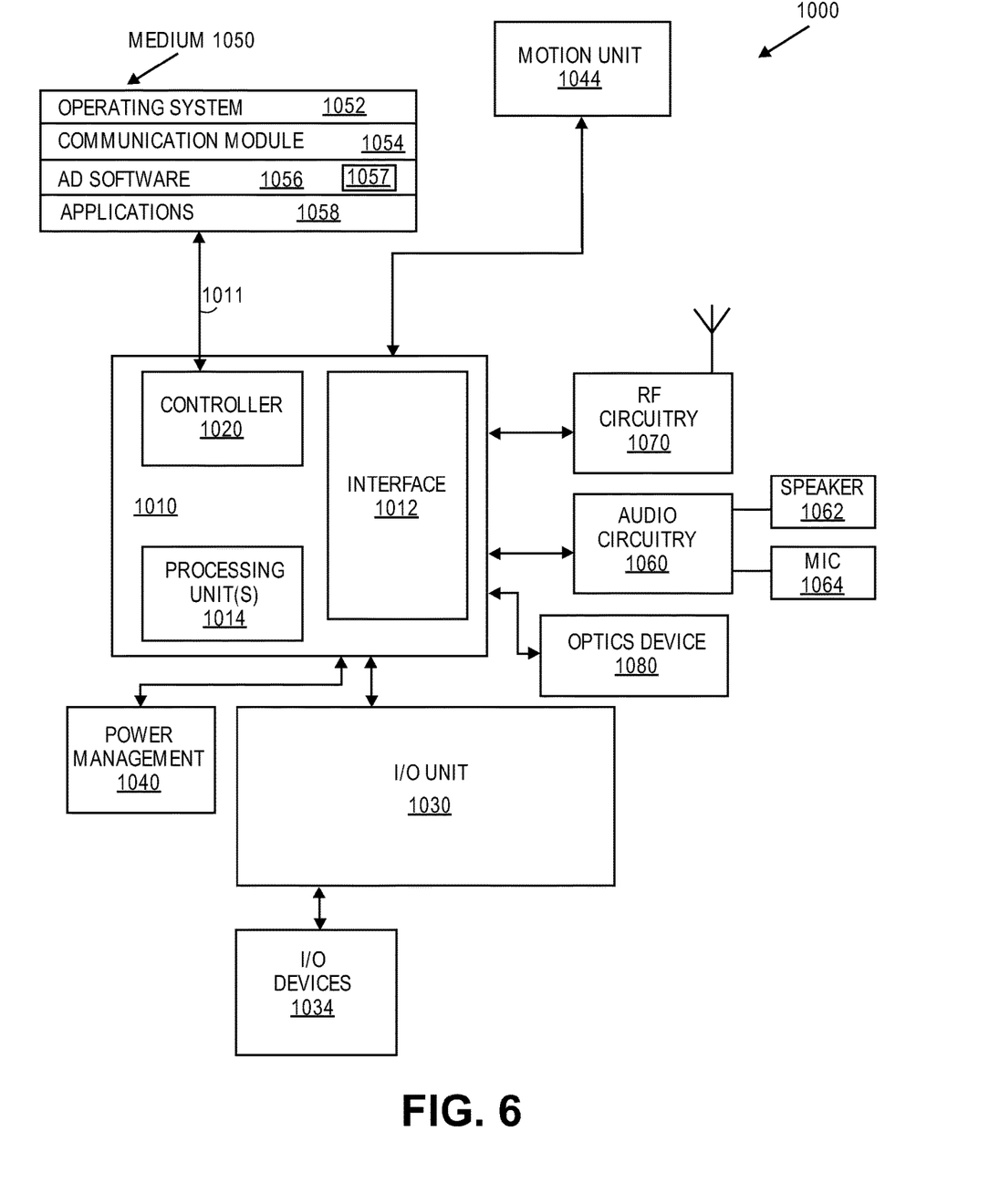
FIG. 6 is a block diagram of a wireless device 1000 in accordance with one embodiment.

FIG. 6 is a block diagram of a wireless device 1000 in accordance with one embodiment. The wireless device 1000 (e.g., device 230) may be any type of wireless device (e.g., cellular phone, wireless phone, tablet, etc.) for sending and receiving wireless communications. The wireless device includes a processing system 1010 that includes a controller 1020 and processing unit(s) 1014, which include processing logic. The processing system 1010 communicates with an Input/Output (I/O) unit 1030, radio frequency (RF) circuitry 1070, audio circuitry 1060, an optics device 1060 for capturing one or more images or video, a motion device (e.g., an accelerometer, gyroscope, etc.) for determining motion data (e.g., in three dimensions) for the wireless device 1000, power management system 1040, and machine-accessible non-transitory medium 1050. These components are coupled by one or more communication links or signal lines.

RF circuitry 1070 is used to send and receive information over a wireless link or network to one or more other devices. Audio circuitry 1060 is coupled to audio speaker 1062 and microphone 1064 and includes known circuitry for processing voice signals.

One or more processing units 1014 communicate with one or more machine-accessible non-transitory mediums 1050 (e.g., computer-readable medium) via controller 1020. Medium 1050 can be any device or medium (e.g., storage device, storage medium) that can store code and/or data for use by one or more processing units 1014. Medium 1050 can include a memory hierarchy, including but not limited to cache, main memory and secondary memory. The medium 1050 stores one or more sets of instructions (or software) embodying any one or more of the methodologies or functions described herein. The software may include an operating system 1052, advertising services software 1056 (e.g., SDK 1056), communications module 1054, and applications 1058 (e.g., publisher applications, developer applications, a web browser, html5 applications, etc.). The advertising services software 1056 (e.g., SDK 1056) may include or be associated with dynamic ad creative deep linking functionality 1057 for implementing operations of methods described herein. The software may also reside, completely or at least partially, within the medium 1050 or within the processing units 1014 during execution thereof by the device 1000. The components shown in FIG. 10 may be implemented in hardware, software, firmware or any combination thereof, including one or more signal processing and/or application specific integrated circuits.

Communication module 1054 enables communication with other devices. The I/O unit 1030 communicates with different types of input/output (I/O) devices 1034 (e.g., a display, a liquid crystal display (LCD), a plasma display, a cathode ray tube (CRT), touch display device, or touch screen for receiving user input and displaying output, an optional alphanumeric input device).

In one embodiment, a machine-accessible non-transitory medium contains executable computer program instructions which when executed by a data processing system cause the system to perform any of the methods discussed herein. While the machine-accessible non-transitory medium 1050 is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media, and carrier wave signals.

In one embodiment, a system (e.g., system 100, system 201) with dynamic ad creative deep linking for custom deep linking within an ad campaign with respect to a user of a device includes a storage medium (e.g., storage medium 136, storage medium 204) to store one or more software programs of an ad server. Processing logic of the ad server is coupled to the storage medium. The processing logic execute instructions of the one or more software programs of the ad server to implement functionality of the ad server.

In one embodiment, an advertising system for delivering advertising services with dynamic ad creative deep linking to devices includes a storage medium to store one or more software programs of an ad server and processing logic of the ad server that is coupled to the storage medium. The processing logic is configured to execute instructions of the one or more software programs of the ad server and a dynamic ad creative deep linking unit of the ad server is coupled to the processing logic. The dynamic ad creative deep linking unit is configured to receive an ad campaign including at least one video ad from the ad server and to generate a customized deep link for a targeted software application or targeted content of the at least video ad based on installed applications of a device, application usage history of the installed applications, and metadata associated with at least one of the installed applications.

The processing logic of the ad server is further configured to execute instructions to receive an ad request from the device upon a user of the device initiating a software application on the device which is a mobile device and send the ad campaign having at least one video ad with the customized deep link to the mobile device in response to the ad request, wherein the at least one video ad having the customized deep link is displayed on the mobile device in-application (in-app) within the initiated software application.

In one example, the metadata associated with the at least one of the installed applications includes content tags relating to content requested based on a search query within at least one of the installed applications. In another example, the customized deep link for a targeted software application or targeted content of the at least one video ad provides access to customized features or content of the targeted software application.

In one embodiment, the customized deep link for a targeted software application or targeted content of the at least one video ad provides access to customized features or content of the targeted software application based on the content tags relating to content requested based on a search query within at least one of the installed applications.

In one example, the customized deep link for a targeted software application or targeted content of the at least one video ad provides access to the targeted content within the at least one installed application based on the content tags relating to content requested based on a search query within the at least one installed application.

In one embodiment, a machine-accessible non-transitory medium containing executable computer program instructions which when executed by an advertising system cause the advertising system to perform a method for delivering advertising services with dynamic ad creative deep linking to devices. The method includes receiving, with a dynamic ad creative deep linking unit, an ad campaign including at least one video ad and generating a customized deep link for a targeted software application or targeted content of the at least video ad based on at least one of installed applications of a device, application usage history of the installed applications, and metadata associated with at least one of the installed applications.

In one example, the metadata associated with the at least one of the installed applications includes content tags relating to content requested based on a search query within at least one of the installed applications.

In one example, the customized deep link for a targeted software application or targeted content of the at least one video ad provides access to customized features or content of the targeted software application.

In another example, the customized deep link for a targeted software application or targeted content of the at least one video ad provides access to customized features or content of the targeted software application based on the content tags relating to content requested based on a search query within at least one of the installed applications.

In one embodiment, the customized deep link for a targeted software application or targeted content of the at least one video ad provides access to the targeted content within the at least one installed application based on the content tags relating to content requested based on a search query within the at least one installed application.

In one embodiment, the processing logic of the ad server is configured to execute instructions to receive an ad request from the device upon a user of the device initiating a software application on the device which is a mobile device and send the ad campaign having at least one video ad with the customized deep link to the mobile device in response to the ad request, wherein the at least one video ad having the customized deep link is displayed on the mobile device in-application (in-app) within the initiated software application.

In one embodiment, a device for delivering advertising services with dynamic ad creative deep linking includes a storage medium to store one or more software programs, a display device to display the advertising services with dynamic ad creative deep linking in-application (in-app) on the device, and processing logic coupled to the storage medium. The processing logic is configured to execute instructions of at least one software program to initiate a software application and associated advertising services software on the device, generate, with the device, an ad request in response to the initiation of the software application and associated advertising services software, send the ad request to an ad system, generate a customized deep link for a targeted software application or targeted content of the advertising services including at least video ad based on installed applications of the device, application usage history of the installed applications, and metadata associated with at least one of the installed applications, and receive the advertising services with dynamic ad creative deep linking in response to the ad request.

In one example, the metadata associated with the at least one of the installed applications includes content tags relating to content requested based on a search query within at least one of the installed applications. In another example, the customized deep link for a targeted software application or targeted content of the at least one video ad provides access to customized features or content of the targeted software application.

In one embodiment, the customized deep link for a targeted software application or targeted content of the at least one video ad provides access to customized features or content of the targeted software application based on the content tags relating to content requested based on a search query within at least one of the installed applications.

In one example, the customized deep link for a targeted software application or targeted content of the at least one video ad provides access to the targeted content within the at least one installed application based on the content tags relating to content requested based on a search query within the at least one installed application.

In one embodiment, the at least one video ad having the customized deep link is displayed on the device, which is a mobile device, in-app within the initiated software application.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An advertising system for delivering advertising services with dynamic ad creative deep linking to wireless devices, comprising:
    a storage medium to store one or more software programs of an ad server;
    processing logic of the ad server coupled to the storage medium, the processing logic to execute instructions of the one or more software programs of the ad server to receive an ad request from a wireless mobile device with the ad request having device characteristics including make and model, a network connection, and a type of operating system of the wireless mobile device, and to send an ad campaign having at least one video ad with a customized deep link to the wireless mobile device in response to the ad request, wherein the at least one video ad having the customized deep link is displayed on the wireless mobile device in-application (in-app) within an initiated non-web browser software application; and a dynamic ad creative deep linking unit of the ad server coupled to the processing logic, the dynamic ad creative deep linking unit is configured to receive the ad campaign including at least one video ad from the ad server and to generate the customized deep link within the at least video ad for a targeted software application or targeted content in response to installed applications of the wireless mobile device, application usage history of the installed applications on the wireless device, and the type of operating system of the wireless mobile device, wherein the customized deep link to link to a specific customized location within the targeted software application based on metadata including content tags relating to content requested by a user of the wireless mobile device from a previous search query within a software application.

2. The system of claim 1, wherein the metadata associated with the at least one of the installed applications includes content tags relating to content requested based on a search query within at least one of the installed applications, wherein the ad campaign includes an interactive card to receive touch input from the user.

3. The system of claim 1, wherein the customized deep link for a targeted software application or targeted content of the at least one video ad provides access to customized features or content of the targeted software application.

4. The system of claim 2, wherein the customized deep link for a targeted software application or targeted content of the at least one video ad provides access to customized features or content of the targeted software application based on the content tags relating to content requested based on a search query within at least one of the installed applications.

5. The system of claim 2, wherein the customized deep link for a targeted software application or targeted content of the at least one video ad provides access to the targeted content within the at least one installed application based on the content tags relating to content requested based on a search query within the at least one installed application.

6. The system of claim 1, wherein the processing logic of the ad server to execute instructions to receive an ad request from the device upon a user of the device initiating a software application on the device which is a mobile device and send the ad campaign having at least one video ad with the customized deep link to the mobile device in response to the ad request, wherein the at least one video ad having the customized deep link is displayed on the mobile device in-application (in-app) within the initiated software application.

7. A machine-accessible non-transitory medium containing executable computer program instructions which when executed by an advertising system cause the advertising system to perform a method for delivering advertising services with dynamic ad creative deep linking to wireless devices, the method comprising:
    receiving an ad request from a wireless mobile device with the ad request having device characteristics including make and model, a network connection, and a type of operating system of the wireless mobile device;
    receiving, with a dynamic ad creative deep linking unit, an ad campaign including at least one video ad;
    sending the ad campaign having at least one video ad with a customized deep link to the wireless mobile device in response to the ad request, wherein the at least one video ad having the customized deep link is displayed on the wireless mobile device in-application (in-app) within an initiated non-web browser software application; and
    generating within the at least one video ad the customized deep link for a targeted software application or targeted content in response to installed applications of the wireless mobile device, application usage history of the installed applications on the wireless device, and the type of operating system of the wireless mobile device, wherein the customized deep link to link to a specific customized location within the targeted software application based on metadata including content tags relating to content requested by a user of the wireless mobile device from a previous search query within a software application.

8. The machine-accessible non-transitory medium of claim 7, wherein the metadata associated with the at least one of the installed applications includes content tags relating to content requested based on a search query within at least one of the installed applications.

9. The machine-accessible non-transitory medium of claim 7, wherein the customized deep link for a targeted software application or targeted content of the at least one video ad provides access to customized features or content of the targeted software application.

10. The machine-accessible non-transitory medium of claim 8, wherein the customized deep link for a targeted software application or targeted content of the at least one video ad provides access to customized features or content of the targeted software application based on the content tags relating to content requested based on a search query within at least one of the installed applications.

11. The machine-accessible non-transitory medium of claim 8, wherein the customized deep link for a targeted software application or targeted content of the at least one video ad provides access to the targeted content within the at least one installed application based on the content tags relating to content requested based on a search query within the at least one installed application.

12. The machine-accessible non-transitory medium of claim 7, wherein the processing logic of the ad server to execute instructions to receive an ad request from the device upon a user of the device initiating a software application on the device which is a mobile device and send the ad campaign having at least one video ad with the customized deep link to the mobile device in response to the ad request, wherein the at least one video ad having the customized deep link is displayed on the mobile device in-application (in-app) within the initiated software application.

13. A wireless mobile device for providing advertising services with dynamic ad creative deep linking, comprising:
   a storage medium to store one or more software programs;
   a display device to display the advertising services with dynamic ad creative deep linking in-application (in-app) on the wireless mobile device; and
   processing logic coupled to the storage medium, the processing logic is configured to execute instructions of at least one software program to:
   initiate a non-web browser software application and associated advertising services software on the wireless mobile device;
   generate, with the wireless mobile device, an ad request in response to the initiation of the non-web browser software application and associated advertising services software;
   send the ad request to an ad system with the ad request having device characteristics including make and model, a network connection, and a type of operating system of the wireless mobile device;
   generate within at least one video ad a customized deep link for a targeted software application or targeted content in response to installed applications of the wireless mobile device, application usage history of the installed applications on the wireless mobile device, and the type of operating system of the wireless mobile device, wherein the customized deep link to link to a specific customized location within the targeted software application based on metadata including content tags relating to content requested by a user of the wireless mobile device from a previous search query within a software application; and
   receive an ad campaign including the at least one video ad with dynamic ad creative deep linking in response to the ad request.

14. The wireless mobile device of claim 13, wherein the metadata associated with the at least one of the installed applications includes content tags relating to content requested based on a search query within at least one of the installed applications.

15. The wireless mobile device of claim 13, wherein the customized deep link for a targeted software application or targeted content of the at least one video ad provides access to customized features or content of the targeted software application.

16. The wireless mobile device of claim 14, wherein the customized deep link for a targeted software application or targeted content of the at least one video ad provides access to customized features or content of the targeted software application based on the content tags relating to content requested based on a search query within at least one of the installed applications.

17. The wireless mobile device of claim 14, wherein the customized deep link for a targeted software application or targeted content of the at least one video ad provides access to the targeted content within the at least one installed application based on the content tags relating to content requested based on a search query within the at least one installed application.

18. The wireless mobile device of claim 13, wherein the at least one video ad having the customized deep link is displayed on the wireless mobile device, which is a mobile device, in-app within the initiated software application.

* * * * *